(12) United States Patent
Glantz

(10) Patent No.: US 7,082,691 B2
(45) Date of Patent: Aug. 1, 2006

(54) LASER LEVEL ROTOR ASSEMBLY ADDRESSING ANGULAR DRIFT

(75) Inventor: Michael L. Glantz, Kettering, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 94 days.

(21) Appl. No.: 10/833,929

(22) Filed: Apr. 28, 2004

(65) Prior Publication Data

US 2005/0241164 A1    Nov. 3, 2005

(51) Int. Cl.
*G01C 5/00* (2006.01)
(52) U.S. Cl. ............... 33/290; 33/DIG. 21; 33/286; 29/898.07; 384/517; 384/518
(58) Field of Classification Search .......... 33/290, 33/286, 227, 281, 282, 285, 706, 707, 708, 33/DIG. 21; 29/898.07, 458; 384/537, 585, 384/517, 518

See application file for complete search history.

(56) References Cited

U.S. PATENT DOCUMENTS

| | | | |
|---|---|---|---|
| 3,679,279 A * | 7/1972 | Van Dorn et al. .......... 384/537 |
| 3,909,083 A * | 9/1975 | Vahle .......................... 384/537 |
| 4,065,190 A * | 12/1977 | Hallerback .............. 29/898.07 |
| 4,281,463 A * | 8/1981 | Kobayashi et al. ........... 33/285 |
| 4,452,654 A * | 6/1984 | KaDell, Jr. .............. 29/898.07 |
| 4,529,324 A * | 7/1985 | Champagne et al. ....... 384/518 |
| 4,545,570 A | 10/1985 | KaDell, Jr. |
| 4,695,102 A * | 9/1987 | Crotti ......................... 384/517 |
| 4,719,352 A * | 1/1988 | Miyatake et al. ........... 384/517 |
| 4,810,108 A * | 3/1989 | Yajima ....................... 384/537 |
| 5,207,514 A * | 5/1993 | Weissgerber ................ 384/537 |
| 5,305,525 A | 4/1994 | Susnjara et al. |
| 5,878,475 A | 3/1999 | Stutsman |
| 6,513,984 B1 | 2/2003 | Hobaugh, II |
| 6,688,011 B1 * | 2/2004 | Gamal et al. .................. 33/290 |
| 6,709,162 B1 * | 3/2004 | Muraki et al. ........... 29/898.07 |
| 6,762,575 B1 * | 7/2004 | Douglas ..................... 318/254 |

FOREIGN PATENT DOCUMENTS

JP        54102443 A  *  8/1979

* cited by examiner

Primary Examiner—Diego Gutierrez
Assistant Examiner—Travis Reis
(74) Attorney, Agent, or Firm—Dinsmore & Shohl LLP

(57) ABSTRACT

A rotor shaft is supported in a housing of a rotor assembly for a laser level. Bearings support the rotor shaft for rotation relative to the housing. An adhesive fixes an outer race of at least one of the bearings in position between the rotor shaft and the housing. The adhesive is a low viscosity, quick setting anaerobic adhesive, which when cured prevents angular drift of the shaft relative to the housing by eliminating the clearance that would have existed between the outer race and the housing.

10 Claims, 2 Drawing Sheets

LASER LEVEL ROTOR ASSEMBLY ADDRESSING ANGULAR DRIFT

BACKGROUND OF THE INVENTION

The present invention relates generally to rotating laser levels, and more particularly to a rotor assembly of a laser level having a rotor shaft that is supported by bearings for rotation within a housing which addresses angular drift of the rotor shaft.

Conventional rotor assemblies for laser levels may have bearings supporting a rotor shaft for rotation within a housing. These bearings are typically formed of inner and outer races housing ball bearings. Such bearings are typically shaft mounted and fitted into a housing for support and alignment. However, in precision laser level applications, detectable angular drift from time to time will creep into measurements. For example, such angular drift can cause a timing error of an incremental encoder used on the shaft, which is sensitive to the changing shaft angle. Such timing error results in positional errors.

SUMMARY OF THE INVENTION

Against this backdrop the present invention has been developed. It was discovered by the inventor that movement of a rotor shaft driving a rotatable laser level is a highly sensitive source of angular drift (i.e., any unintended change in output, either amplitude or frequency or azimuth, of the beam; measured in milliradians). Gluing the outer race of the bearings rotatably supporting the rotor shaft to the rotor assembly housing addresses this problem. The result of this gluing is that the rotor shaft can no longer displace through the clearance that would have existed between the outer race and the corresponding bearing seat of the housing. As such, the present invention helps minimizes or eliminates timing errors of an encoder mounted to the shaft.

One embodiment of the present invention is a laser level having a rotor shaft that is supported by bearings for rotation within a housing, wherein the outer race of at least one bearing is bonded to the housing.

Another embodiment of the present invention is an angular drift control method for a laser level rotor assembly having a rotor shaft that is supported by bearings for rotation within a housing by bonding the outer race of at least one bearing to the housing.

In another embodiment, a laser level having a rotor assembly is provided. The rotor assembly comprises a housing with first and second internal shoulder portions. A first bearing is provided adjacent the first shoulder portion. A second bearing is provided adjacent the second shoulder portion. The second bearing has an outer race. A rotor shaft is supported by the first and second bearings for rotation relative to the housing. A spring preloads the bearings, and a nut cap is fitted to the housing enclosing the spring and the first and second bearings within the housing. The outer race of the second bearing is bonded to the housing by an adhesive.

In still another embodiment, a method of fabricating a rotor assembly of a laser level is disclosed. The method comprises providing a housing having an elongated bore therein and a throughbore extending through an exterior surface to said bore. The method further includes forming a subassembly by mounting a pair of spaced apart bearings on a rotor shaft, wherein the bearings having an outer race. The method also includes positioning the subassembly in the bore of the housing such that the outer race of at least one of the bearings is positioned adjacent said throughbore; and preloading the pairs of bearings. The method also includes injecting a precured liquid adhesive through the throughbore into a clearance gap between the outer race and said housing, and allowing the adhesive to cure to bond the outer race to the housing.

These and other features and advantages of the invention will be more fully understood from the following description of preferred embodiments of the invention taken together with the accompanying drawings. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which.

DETAILED DESCRIPTION OF THE PREFERRED EMBODIMENTS

Figure 1:
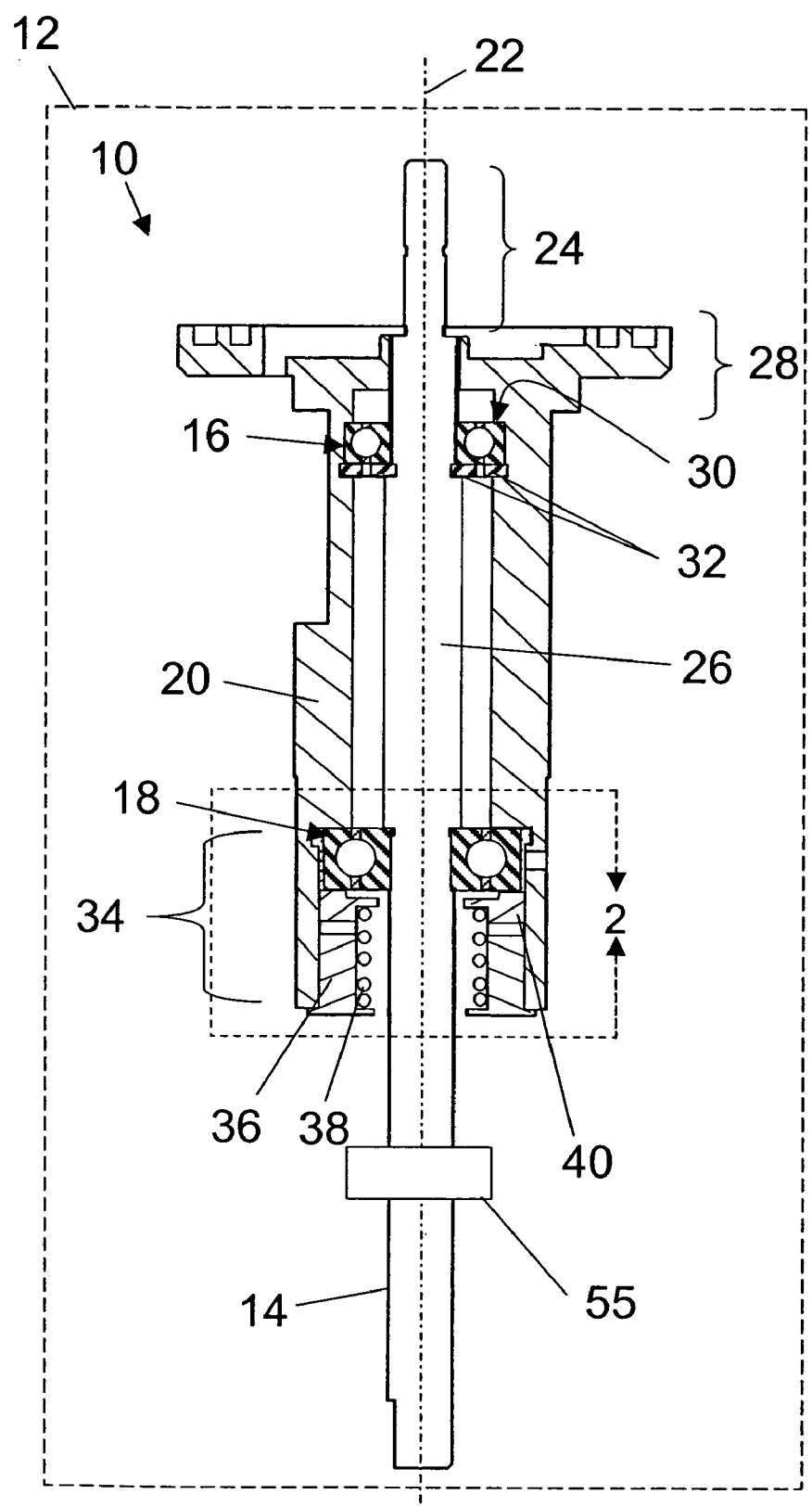
FIG. 1 is a side view, partially in section, of a rotor assembly for a laser level constructed in accordance with the present invention.
Figure 2:
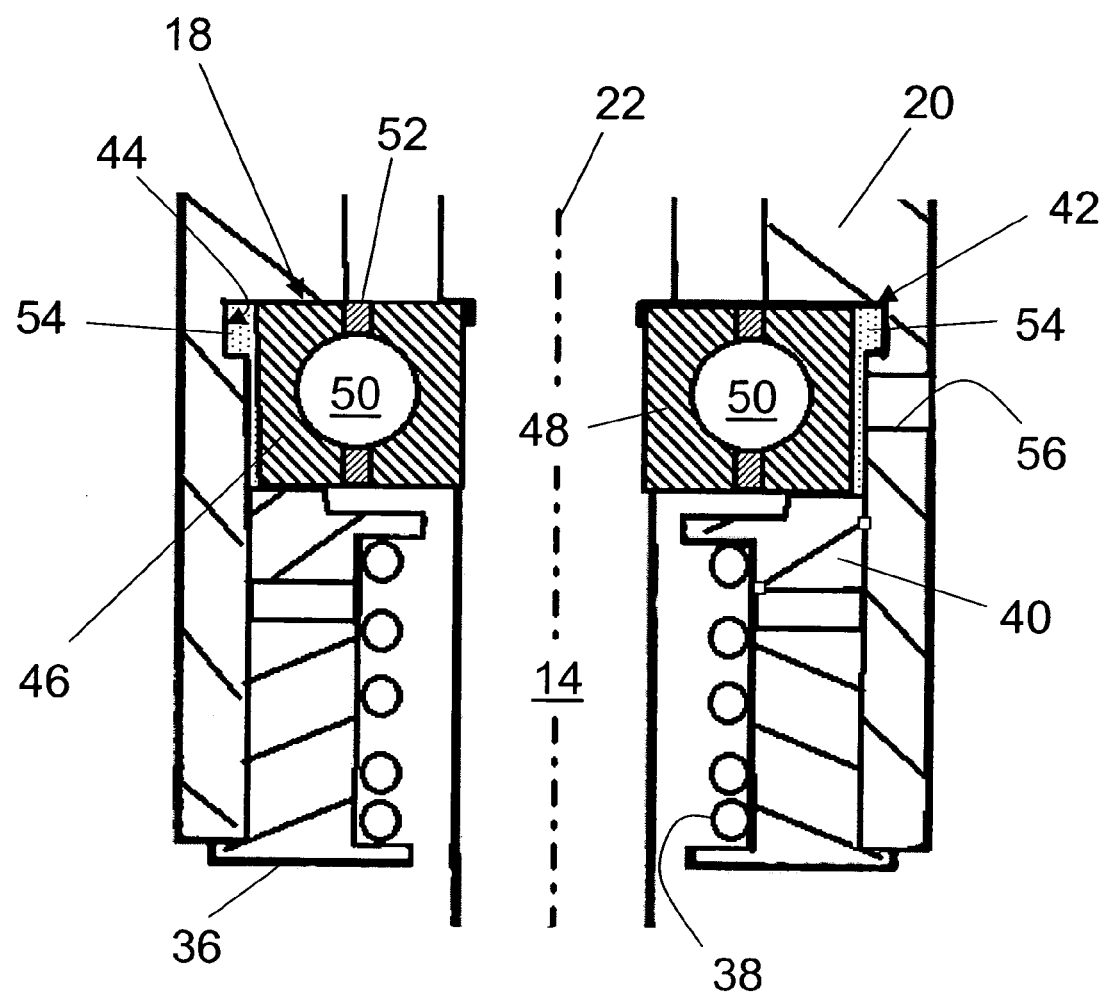
FIG. 2 is an enlarged sectional view of a portion of the drive assembly of FIG. 1.

FIGS. 1 and 2 illustrate an exemplary embodiment of the present invention which is directed to a rotor assembly 10 for a laser level, generally indicated as symbol 12. FIGS. 1 and 2 also illustrate an angular drift control method for a rotor assembly 10 for a laser level 12. Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiment(s) of the present invention. Furthermore, skilled artisans understand that the laser level 12 inherently includes other elements in addition to the rotor assembly 10, such as laser leveling means and laser generating means which are conventional, and thus no further discussion is provided.

Referring to FIG. 1, the rotor assembly 10 includes a rotor shaft 14 for effecting beam rotation (not shown) of the laser level 12. The rotor shaft 14 is supported by upper and lower bearings 16 and 18, respectively for rotation within a housing 20. The rotor shaft 14 has a generally cylindrical configuration centered on an axis 22. The rotor shaft 14 has a load surface portion 24 with a first diameter, and a supported shaft portion 26 accommodated with the housing 20. The supported shaft portion 26 has a second diameter larger than the first diameter of the load surface portion 24.

An upper end portion 28 of the housing 20 provides a first interior shoulder 30 located below the load surface portion 24 on the rotor shaft 14. The interior shoulder 30 provides a seating surface for the upper bearing 16. The upper bearing 16 is held in place against the shoulder 30 by splints or snap rings 32. It is to be appreciated that snap rings 32 help limit relative axial movement of the rotor shaft 14 and the bearings 16 and 18. A terminal end portion 34 of the housing 20 is threaded on the interior surface to accommodate a nut cap 36. The nut cap 36 compresses a spring 38 against an annular plate 40, which pre-loads axially the lower bearing 18.

Referring now to FIG. 2, housing 20 includes a second interior shoulder 42 having an inner curved surface 44 with a diameter larger than the diameter of the remaining surface portion of the terminal end portion 34, thereby creating a groove within the housing 20. Lower bearing 18 has a spherical outer shape which is slightly smaller than both the inner curved surface 44 and interior diameter of terminal end portion 34, thereby creating a clearance gap of approximately 0.25 mm or less. Lower bearing 18, which may be considered as conventional, includes an outer race 46, an inner race 48, and a row of ball bearings, roller bearings, or the like 50. Ball bearings 50 are held in place between outer race 46 and inner race 48 by a cage 52. The inner race 48 is secured to the rotor shaft by a press fit, or if desired, by an adhesive bond.

The outer race 46 of the lower bearing 18 is adhesively secured to the housing 20 firmly against the lower shoulder 42 by means of a bonding material 54. It was discovered by the inventor that movement of the rotor shaft 14 is a highly sensitive source of angular drift in of rotating laser level, and that gluing the outer race 46 of the lower bearing 18 to the housing 20 by filling the clearance gap therebetween addresses this problem. Accordingly, the present invention helps minimizes or eliminates timing errors of an encoder 55 mounted to the rotor shaft 14 (FIG. 1).

In one embodiment, the bonding material is a low viscosity, quick setting anaerobic adhesive. A suitable bonding material to fill the clearance gap is an epoxy-resin adhesive sold by the Loctite Corporation of Newington, Conn., under the trademark RC/609 RETAINING COMPOUND or similar bonding material. It is to be appreciated that providing a groove with the inner curved surface 44 allows for uniform flow and distribution of the epoxy-resin adhesive to sufficiently bond the outer race to the housing to manufacturing specifications.

The parts of the rotor assembly 10, that is the rotor shaft 14, the bearings 16 and 18, the annular plate 40, spring 38, and nut cap 36, are assembled into the housing 20 in the condition shown in FIGS. 1 and 2. After compressing the spring 38 against the annular plate 40 by screwing nut cap 36 into the terminal end portion 34 of housing 20, thereby preloading bearings 16 and 18, the adhesive 54 is applied in a liquid form through a plurality of throughbores 56. In one embodiment, the throughbores 56 (only one of which is shown for ease of illustration) are provided around the circumference of the housing 20 adjacent at least the lower bearing 18 in order to adequately bond the outer race 46 to the interior surface of the housing 20 adjacent the second shoulder 42. In another embodiment, similar throughbores may also be provided around the circumference of the housing 20 adjacent the upper bearing 16 for the same purpose.

A suitable fixture (not shown) is used to hold the rotor assembly 10, and the adhesive 54 is allowed to dry. When this curing process is completed, the adhesive 54 fixes, or secures, the outer race 46 of the bearing 18 to the housing 20 filling at least the gap therebetween. It is to be appreciated that because of the presence of the gap between the lower bearing 18 and housing 20, which are filled with the adhesive 54, the circular surface of the housing in at least the terminal end portion 34 need not be machined to close enough tolerances to achieve an exact press fit. In addition, because of the presence of the gap, which is filled with adhesive 54, the interior surface in at least the terminal end portion 34 can have a lack of concentricity, and the parts can still be assembled as desired for smooth rotation.

From the above description of the invention, those skilled in the art will perceive improvements, changes and modifications in the invention. Such improvements, changes and modifications within the skill of the art are intended to be covered by the appended claims.

What is claimed is:

1. In a laser level having laser leveling means for providing a leveling beam and a rotary assembly, the improvement comprising:
   said rotor assembly having:
      a housing;
      a bearing having an outer race provided within said housing, said outer race being preloaded axially by a spring; and
   a rotor shaft supported by said bearing for rotation relative to said housing, said rotor shaft is configured to effect beam rotation of the laser leveling means, and wherein said outer race is bonded to the housing which mitigates angular drift of the beam rotation.

2. The laser level as set forth in claim 1 wherein said outer race is bonded to the housing by an adhesive.

3. The laser level as set forth in claim 1 wherein said bearing has an inner race fixed for rotation with said rotor shaft and the outer race is bonded to the housing by a low viscosity, quick setting anaerobic adhesive.

4. The laser level as set forth in claim 1 wherein said housing provides a gap clearance of less than about 0.25 mm between said outer race, wherein an adhesive fills the gap clearance to bond said outer race to said housing.

5. The laser level as set forth in claim 1 wherein said bearing is a first bearing and the rotor assembly further comprises a second bearing supporting said rotor shaft for rotation relative to said housing.

6. The laser level as set forth in claim 1 wherein said outer race is bonded to the housing by an epoxy-resin adhesive.

7. The laser level as set forth in claim 1 further comprising an encoder mounted to the rotor shaft, wherein said outer race being bonded to the housing helps minimizes or eliminates timing errors of said encoder.

8. In a laser level having laser leveling means for providing a leveling beam and a rotary assembly, the improvement comprising:
   said rotor assembly having:
      a housing with first and second internal shoulder portions;
      a first bearing provided adjacent said first shoulder portion;
      a second bearing provided adjacent said second shoulder portion, said second bearing having an outer race;
      a rotor shaft being supported by said first and second bearings for rotation relative to said housing, said rotor shaft is configured to effect beam rotation of the laser leveling means;
      a spring preloading axially said outer race of said second bearings; and
      a nut cap fitted to said housing adjacent said second bearing and enclosing said spring and said bearings within said housing, wherein said outer race of said second bearing is bonded to said housing by an adhesive which mitigates angular drift of the beam rotation.

9. An angular drift control method for a laser level having laser leveling means for providing a leveling beam and a rotor assembly comprising a rotor shaft supported by a bearing for rotation within a housing and configured to effect beam rotation of the laser leveling means, said method comprising preloading axially an outer race of the least one bearing with a spring; and bonding said outer race of the least one bearing to the housing which mitigates angular drift of the beam rotation.

10. A method of fabricating a rotor assembly of a laser level comprising: providing a laser leveling means for providing a leveling beam
    providing a housing having an elongated bore therein and a throughbore extending through an exterior surface to said bore; wherein said housing supports said laser leveling means
    forming a subassembly by mounting a pair of spaced apart bearings on a rotor shaft, said bearings having an outer race, said rotor shaft being configured to effect beam rotation of the laser leveling means;
    positioning said subassembly in said bore of the housing such that the outer race of at least one of said bearings is positioned adjacent said throughbore;
    preloading axially said outer race with a spring; and
    injecting a precured liquid adhesive through said throughbore into a clearance gap between said outer race and said housing; and
    allowing said adhesive to cure to bond said outer race to said housing which mitigates angular drift of the beam rotation.

\* \* \* \* \*